United States Patent [19]
Lee et al.

[11] 3,790,857
[45] Feb. 5, 1974

[54] PROTECTIVE CIRCUIT FOR NONSEQUENCING MULTIPOLE GROUND FAULT CIRCUIT INTERRUPTER

[75] Inventors: Sung Chuel Lee, Bridgeport; Paul Muchnick, Norwalk, both of Conn.

[73] Assignee: Harvey Hubbell Incorporated, Bridgeport, Conn.

[22] Filed: Dec. 29, 1972

[21] Appl. No.: 319,186

[52] U.S. Cl............ 317/18 D, 307/127, 317/33 SC
[51] Int. Cl. ............................................. H02h 3/28
[58] Field of Search ...... 317/18 D, 33 SC; 307/127

[56] References Cited
UNITED STATES PATENTS
3,506,906   4/1970   Nestor ............................. 317/18 D
3,548,259   12/1970   McDonald ....................... 317/18 D Primary Examiner—James D. Trammell
Attorney, Agent, or Firm—Wooster, Davis & Cifelli

[57] ABSTRACT

A protective circuit for a ground fault interrupter having a multipole circuit interrupter for ensuring that the sensing and actuating circuit is energized as soon as any one of the poles of the circuit interrupter closes, thereby preventing potential hazards. More specifically, switching devices each responsive to the closing of a different pole are connected between the sensing and actuating circuit and the power source. As soon as any one of the poles closes, the sensing and actuating circuit is energized. The circuit is arranged so that the sensing and actuating circuit is deenergized when all the poles are open to reduce the consumption of energy and the wear on the circuit components.

15 Claims, 2 Drawing Figures

PATENTED FEB 5 1974　　　　　　　　　　　　　　　　　3,790,857

PROTECTIVE CIRCUIT FOR NONSEQUENCING MULTIPOLE GROUND FAULT CIRCUIT INTERRUPTER

BACKGROUND OF THE INVENTION

This invention relates to ground fault interrupters (GFIs) and more particularly to a protective circuit for preventing potential hazards in having multipole circuit interrupters.

GFIs are devices which detect ground leakage currents of such small magnitudes that normal short circuit or overload circuit breakers or fuses are not responsive thereto, but which could well be lethal currents to human beings. Although the sensitivity of such devices varies, they have typically been designed to open the circuit if the leakage current exceeds 5 milliamps. Their importance in protecting human life is readily apparent when one considers that currents in excess of 60 milliamps are generally lethal, and depending on the physical condition of the person and the electrical path which is created, substantially smaller currents can also be lethal or, at the least, quite painful and dangerous.

It is, therefore, important to encourage the installation and use of GFIs in industrial and residential use, especially under specific circumstances where the likelihood of potential hazards is greater or the possiblilites of lethal currents are more probable. To this end GFIs have been permanently installed in many different types of circuits and wiring systems where such permanent installation is feasible. There is also a substantial need for portable devices which can be utilized for different applications at different times. Such portable GFIs are particularly advantageous when equipment at different locations in a plant is utilized only sporadically, or when equipment is utilized at locations where GFIs are not already installed, such as the use of electric power tools in on-site construction work. It is also desirable to provide less expensive GFIs which are likely to be installed by amateurs.

In GFIs it is only necessary to provide a circuit interrupter in series with the line conductor of the wiring system to safely disconnect the circuit should leakage current occur. However, if the GFI were connected to the power supply in reverse, and the circuit interrupter were in series with the neutral conductor, operation of the GFI would be impaired if a ground fault existed or a separate grounding conductor were part of the circuit. Inasmuch as portable GFIs, which are designed to be plugged into a conventional wall socket, may be plugged into the wiring system in reverse and those GFIs that are likely to be installed by amateurs might inadvertently be connected incorrectly, it has generally been the practise to use multipole circuit interrupters in such GFIs.

In most GFIs the power for energizing the sensing and actuating circuit is supplied from the line and neutral conductors, typically through a power transformer connected across the conductors. It is also usually desirable to derive this power from the load side of the circuit interrupters so that the sensing circuit is only energized when the circuit is operating and is deenergized when the circuit interrupters are open. This reduces the energy consumption and wear of the sensing and actuating circuit components. It also eliminates the necessity for resetting means in many GFI designs.

When such an arrangement is utilized with a multipole circuit interrupter GFI, a potential hazard may be created because, despite the fact that the poles are usually mechanically interconnected, one pole usually closes before the other. If the circuit interrupter in series with the line conductor closes before the neutral conductor, a dangerous condition might exist if a ground fault were present, inasmuch as it would not be detected because the sensing and actuating circuit is not energized until all poles are closed. While this can be avoided by connecting the transformer on the input side of the circuit interrupters, such an arrangement has the undesirable consequences described previously.

SUMMARY OF THE INVENTION

The present invention overcomes this problem relating to multipole circuit interrupter GFIs by utilizing a protective circuit in which the sensing and actuating circuit will still be deenergized when all the poles of the circuit interrupters are open, but will be energized as soon as any one of the poles is closed. This is accomplished by providing switching means responsive to the closing of any one of the poles of the circuit interrupter to connect the sensing and actuating circuit to a power source as soon as any one of the poles close. Where a power transformer is utilized, the switching means may be in series with it. In one embodiment the switching means includes a plurality of semiconductor switches connected in parallel with each other and in series with the primary winding of the power transformer. Each of the switches has a gate electrode connected to the load side of one pole, so that when that pole closes the switch is turned on by a gating signal. A second embodiment is similar, except that the switches are each in series with separate primary windings of the power transformer.

It is, therefore, the general object of the present invention to provide an improved GFI which obviates the problems and disadvantages of previously known GFIs.

It is a more specific object of the present invention to provide a multipole circuit interrupter GFI having a protective circuit to ensure the energization of the sensing and actuating circuit as soon as any one of the poles close.

It is another object of the present invention to provide a multipole circuit interrupter GFI in which the sensing and actuating circuit is deenergized when all of the poles are open to reduce wear on the circuit elements and energy consumption, but which is energized as soon as any one of the poles close.

BRIEF DESCRIPTION OF THE DRAWINGS

These as well as other objects and advantages of the present invention will become apparent to those skilled in the art from a perusal of the appended claims and the following detailed description when read in conjunction with the attached drawing in which:

DETAILED DESCRIPTION OF THE PREFERRED EMBODIMENT

Figure 1:
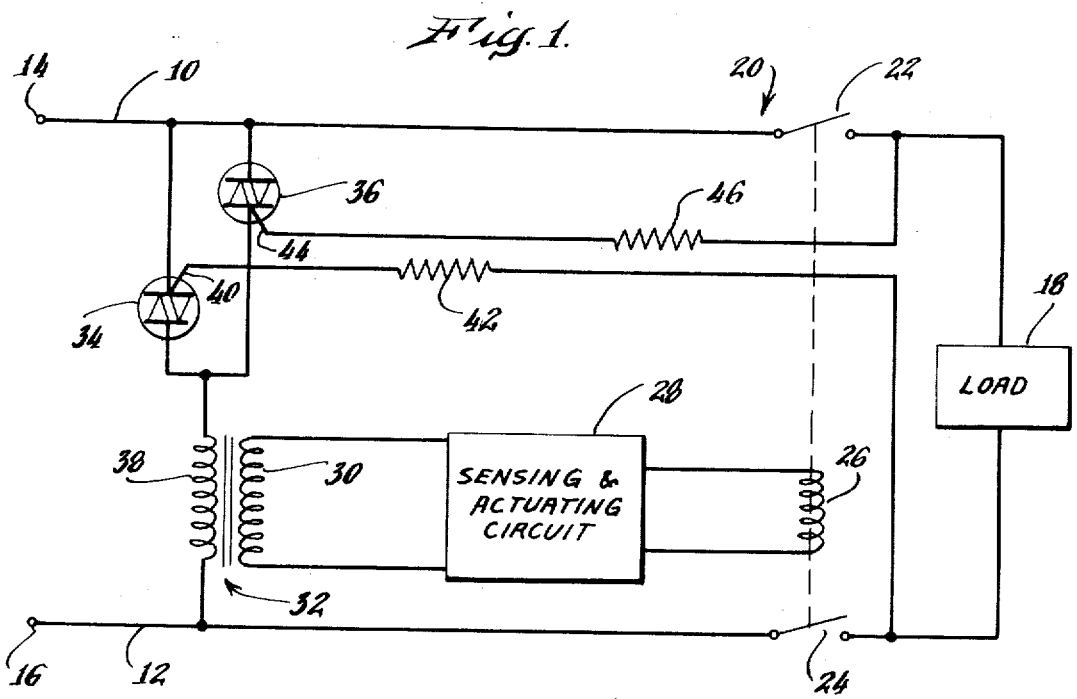
FIG. 1, is a schematic diagram of a preferred embodiment of the present invention and, FIG. 2, is a schematic diagram of a modified version of the embodiment of FIG. 1.

Referring to FIG. 1, the present invention is illustrated as being designed for a two-wire AC system, and includes conductors 1o and 12 having input terminals 14 and 16 respectively, which are adapted to be connected to an AC supply. The input terminals 14 and 16, may for example be the prongs of a conventional male plug adapted to be inserted into a wall socket. Each of the conductors 10 and 12 are adapted to be connected to opposite sides of a load 18 through a double-pole circuit interrupter 20, having a pole 22 in series with the conductor 10, and a pole 24 in series with the conductor 12. The double-pole circuit interrupter 20 may be a conventional circuit breaker which is responsive to a breaker trip coil 26, which opens both poles in response to being energized by a sensing and actuating circuit 28.

The sensing and actuating circuit 28 may be any conventional GFI arrangement. Typically it would include a differential transformer for detecting ground faults by comparing the currents flowing in the line conductors 10 and 12, and appropriate sensing and actuating circuitry responsive to voltage induced, due to inequalities of the current, in a secondary winding of the differential transformer. By way of example, the sensing and actuating circuit may be that shown in the Murphy et al, U.S. Pat. No. 3,525,018 which is assigned to the assignee of the present invention. The sensing and actuating circuit 28, is energized through a secondary winding 30 of a power transformer 32 which includes a protective circuit to which the present invention is particularly directed.

The protective circuit includes semiconductor switches such as triacs 34 and 36 which are connected in parallel with each other and in series with a primary winding 38 of the power transformer 32. By way of example, the triacs may be RCA 40529 triacs. While triacs are utilized in the present embodiment, it will be apparent that other types of switches and semiconductor switches may be utilized as well. The series connection of the primary winding 38 and the parallel triacs 34 and 36 are connected between the conductors 10 and 12. A gate electrode 40 of the triac 34 is connected through a resistor 42 to the load side of the pole 24, and the gate electrode 44 of the triac 36 is connected through a resistor 46 to the load side of the pole 22. Resistors 42 and 46 are provided to limit the current flowing through to the gate electrodes of the triacs and may, for example, be 40 kilohms and 20 kilohms respectively. The difference in values is merely due to the different loading effect the primary winding 38 has on the triacs 34 and 36.

In operation, assuming both poles 22 and 24 are open, the triacs 34 and 36 will be nonconducting, and therefore, the primary winding 38 of the transformer 32 will not be connected across conductors 10 and 12, thus, deenergizing the sensing and actuating circuit 28. Once the circuit interrupter 20 is closed, the sensing and actuating circuit 28 will be energized as soon as one of the poles 22 or 24 closes, thereby preventing a potentially dangerous condition from being created in the event the pole in series with the line conductor closed first and a ground fault existed.

More specifically, assume pole 22 closes first. In that event, a voltage will be applied to the gate 44 to turn the triac 36 on. This completes a circuit between conductors 10 and 12 through the primary winding 38, thereby energizing the sensing and actuating circuit 28. If the pole 24 closes first, a voltage is applied to the gate 40 to turn the triac 34 on. This also completes the circuit between the conductors 10 and 12 through the primary winding 38, thereby, energizing the sensing and actuating circuit 28.

Thus, regardless of which pole 22 or 24 closes first, the sensing and actuating circuit 28 will be energized as soon as one closes to detect any ground faults that might exist. Inasmuch as typically multipole circuit interrupter GFIs are portable or those likely to be installed by amateurs, either conductor 10 or 12 may be in series with the line conductor. The protective circuit of the present invention will still ensure that the sensing and actuating circuit 28 is energized regardless of which of the poles 22 or 24 is in series with the line conductor.

Figure 2:
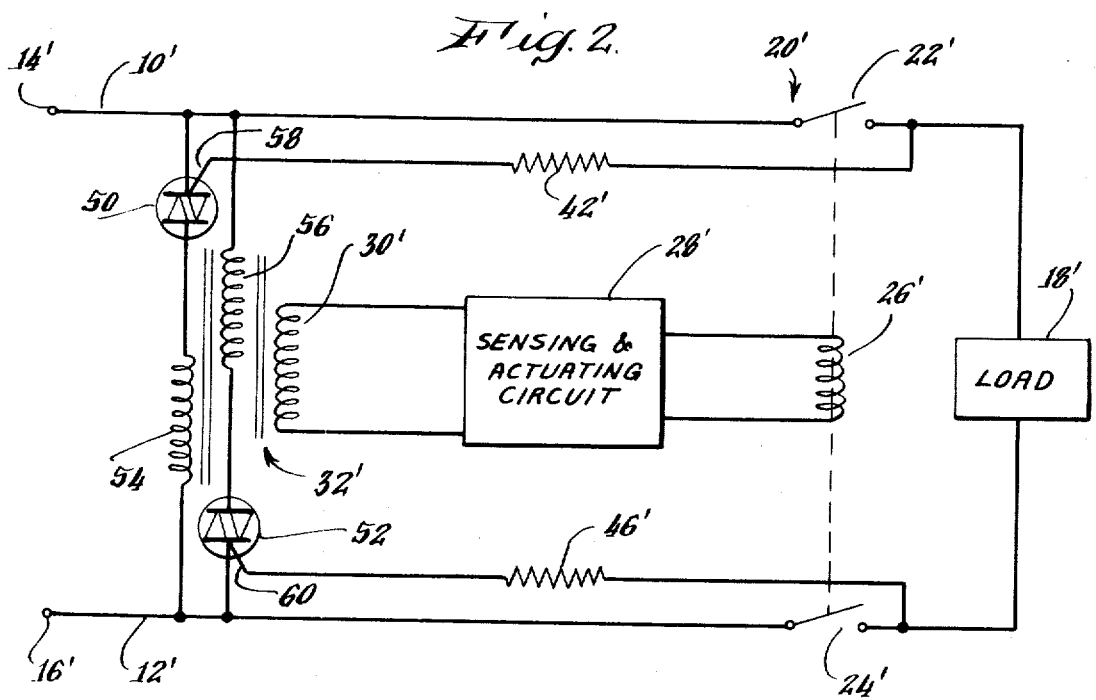

The circuit shown in FIG. 2 differs from that shown in FIG. 1 only in the arrangement of the protective circuit. Similar elements are, therefore, designated by the same numerals as shown in FIG. 1, primed, and the description and operation of these elements will not be repeated. In FIG. 2, the protective circuit includes triacs 50 and 52, which are separately connected in series with individual primary windings 54 and 56, respectively, of power transformer 32'. Both of these series connections, triac 50 and primary winding 54; and triac 52 and primary winding 56; are connected between conductors 10' and 12'. A gate 58 of the triac 50 is connected through the resistor 42' to the load side of the pole 22'. A gate 60 of triac 52 is connected to the resistor 46' to the load side of the pole 24'. It will be readily apparent that the circuit of FIG. 2 operates in the same manner as the circuit of FIG. 1. The only difference between the two circuits is that instead of connecting the triacs in parallel to a single primary winding of the power transformer, the triacs are individually connected with separate primary windings. In this arrangement, inasmuch as the loading effects are the same on both triacs 50 and 52, the resistors 42' and 46' may be equal in value, for example, 20 kilohms.

Thus, the present invention provides an improved multipole circuit interrupter GFI, in which potential hazards that could exist if the pole in series with the line conductor closed first, are avoided. Furthermore, the advantages of deenergizing the sensing and actuating circuit when all poles are open is maintained.

While the present invention has been described solely with respect to a two-conductor, two-pole system, it is readily apparent that it is applicable to systems having three or more conductors, or three or more poles. For example, a third pole merely requires the addition of another triac, with its gate electrode connected to the load side of that pole, in parallel with the triacs 34 and 36 in FIG. 1, or in series with a third primary winding of the transformer 32' in FIG. 2. Also it is readily apparent that the protective circuit of the present invention may be used with other arrangements for energizing the sensing and actuating circuit and is not limited to the power transformer arrangement illustrated in the embodiments.

It will be apparent to those skilled in the art that various changes and modifications may be made in the present invention without departing from the spirit and scope of this invention. Therefore, the foregoing description should be construed as illustrative only rather than limiting.

What is claimed is:

1. In a ground fault interrupter having a sensing and actuating circuit for protecting ground faults, and a multipole circuit interrupter having a pole in series with each conductor supplying a load, said circuit interrupter being responsive to output signals of said sensing and actuating circuit to disconnect the load, the improvement comprising: protective circuit means for connecting said sensing and actuating circuit to a power source as soon as any one of said poles of said multipole circuit interrupter closes; said protective circuit means including switching means for coupling said sensing and actuating circuit to a power source and means coupling said switching means to each of said poles for providing a switching signal to said switching means as soon as any of said poles close.

2. The improvement of claim 1 wherein said sensing and actuating circuit is coupled to said power source through a power transformer and wherein said switching means connects said power transformer to said power source.

3. The improvement of claim 2 wherein said power transformer includes a plurality of separate primary windings corresponding to the number of poles of the circuit interrupter and wherein said switching means includes a plurality of switching devices corresponding to the number of poles of the circuit interrupter each of said switching devices being in series with separate ones of said primary windings between at least two of said conductors supplying the load.

4. The improvement of claim 2 wherein said power transformer and said switching means are connected in series between at least two of said conductors supplying the load.

5. The improvement of claim 1, wherein said switching means includes a plurality of switching devices corresponding in number to the number of poles of the circuit interrupter, said switching devices being connected in parallel to each other, with each being connected to a separate one of said poles.

6. The improvement of claim 5 wherein each of said switching devices is a semiconductor device having a control electrode connected to the conductor in which its associated pole is in series on the load side thereof.

7. The improvement of claim 6 wherein each of said semiconductor devices is a triac.

8. A ground fault interrupter comprising: at least two conductors adapted to be connected between a power source and a load, a sensing and actuating circuit for detecting ground faults, a multipole circuit interrupter having a pole in series with each of said conductors, and switching means responsive to the closing of any one of said poles for coupling said sensing and actuating circuit to a power source.

9. The ground fault interrupter of claim 8 wherein said sensing and actuating circuit is coupled to said power source through a power transformer and wherein said switching means connects said power transformer to said power source.

10. The ground fault interrupter of claim 9 wherein said switching means is connected in series with said power transformer between at least two of said conductors.

11. The ground fault interrupter of claim 8 wherein said switching means includes a plurality of switching devices, corresponding to the number of poles, each of said switching devices being responsive to the closing of a different pole.

12. The ground fault interrupter of claim 11 wherein said sensing and actuating circuit is coupled to said power source through a power transformer having a plurality of primary windings corresponding to the number of poles, each of said primary windings being in series with one of said switching devices between two of said conductors.

13. The ground fault interrupter of claim 11 wherein said sensing and actuating circuit is coupled to said power source through a power transformer, and wherein said plurality of switching devices are connected in parallel to each other and in series with a primary winding of said power transformer between two of said conductors.

14. The ground fault interrupter of claim 11 wherein said switching devices are semiconductor devices having a control electrode connected to the conductor in series with its associated pole on the load side thereof.

15. The ground fault interrupter of claim 14 wherein said semiconductor switching devices are triacs.

* * * * *